United States Patent [19]
Betts et al.

[11] Patent Number: 5,680,451
[45] Date of Patent: Oct. 21, 1997

[54] LISTENER ECHO CANCELLATION FOR MODEMS

[75] Inventors: William Lewis Betts, St. Petersburg; Edward Sigmund Zuranski, Largo, both of Fla.

[73] Assignee: Paradyne Corporation, Largo, Fla.

[21] Appl. No.: 557,635

[22] Filed: Nov. 14, 1995

[51] Int. Cl.$^6$ ................................................. H04B 3/23
[52] U.S. Cl. ........................ 379/410; 379/411; 370/286; 370/290; 375/222
[58] Field of Search ........................ 379/410, 411, 379/406; 370/32.1, 286, 289, 290, 291; 375/222, 229, 230, 231, 232, 233, 234, 235, 236, 265, 346, 350

[56] References Cited

U.S. PATENT DOCUMENTS

| | | | |
|---|---|---|---|
| 4,613,731 | 9/1986 | Godard | 379/410 |
| 5,189,664 | 2/1993 | Cheng | 370/32.1 |
| 5,319,636 | 6/1994 | Long et al. | 370/32.1 |
| 5,406,552 | 4/1995 | Long et al. | 370/32.1 |
| 5,418,778 | 5/1995 | Cummiskey et al. | 370/32.1 |
| 5,577,027 | 11/1996 | Cheng | 379/411 X |
| 5,625,646 | 4/1997 | Goodson et al. | 379/410 X |

OTHER PUBLICATIONS

Bellcore Technical Committe Contribution, TR-30.3/95-11 "Listener Echo and Modem Performance" Nov. 13, 1995.

Primary Examiner—Krista M. Zele
Assistant Examiner—Devendra T. Kumar
Attorney, Agent, or Firm—Thomas, Kayden, Horstemeyer & Risley

[57] ABSTRACT

To improve the signal to noise ratio of the receiver of a receiving modem, the receiving modem is equipped with the ability to cancel the listener echo. Cancellation of the listener echo is achieved by coupling to the listener echo canceller of the receiving modem the phase corrected adaptive equalizer output signal, which is conventionally found in modems. The phase corrected adaptive equalizer output signal contains the in-phase, quadrature (also known as X and Y, or real and imaginary, components of the) received modem signal at the symbol rate. Advantageously, doing so results in an improved SNR for the receiver of the receiving modem, thus allowing higher data rates or reduced error rates without requiring extension of the length of the modem equalizer. When the telephone network does not introduce any frequency offset of the modem signal in the channel, the listener echo canceller may be simplified to reduce its cost.

8 Claims, 2 Drawing Sheets

LISTENER ECHO CANCELLATION FOR MODEMS

TECHNICAL FIELD

This invention relates generally to improving modem performance and, in particular, to improving modem performance by employing echo cancellation techniques.

BACKGROUND OF THE INVENTION

Listener echo is the multiple echo of a signal originating at a transmitting modem that degrades the performance of the receiving modem. In particular, the signal from the transmitting modem a) reflects off the hybrid in the telephone central office (CO) serving the receiving modem, b) returns back to the hybrid in the CO serving the transmitting modem, c) reflects off the hybrid in the CO serving the transmitting modem to d) arrive back at the receiving modem.

In the United States telephone network, each carrier inserts a 6 dB attenuation in the transmit path of each connection. Such an attenuation reduces the listener echo.

SUMMARY OF THE INVENTION

However, in many countries, the telephone network does not include the attenuation necessary to effectively reduce listener echo. In such situation, we have recognized that listener echo can degrade the performance of a modem. In particular, listener echo appears as a degraded signal to noise ratio (SNR) at the receiver of the receiving modem.

In accordance with the principles of the invention, a receiving modem is equipped with the ability to cancel the listener echo. In accordance with an aspect of the invention, cancellation of the listener echo is achieved by coupling to the listener echo canceller of the receiving modem the phase corrected adaptive equalizer output signal, which is conventionally found in modems. The phase corrected adaptive equalizer output signal contains the in-phase, quadrature (also known as X and Y, or real and imaginary, components of the) received modem signal at the symbol rate. Advantageously, doing so results in an improved SNR for the receiver of the receiving modem, thus allowing higher data rates or reduced error rates without requiring extension of the length of the modem equalizer.

In accordance with an aspect of the invention, when the telephone network does not introduce any frequency offset of the modem signal in the channel, the listener echo canceller may be simplified, advantageously reducing its cost.

DETAILED DESCRIPTION

Figure 1:
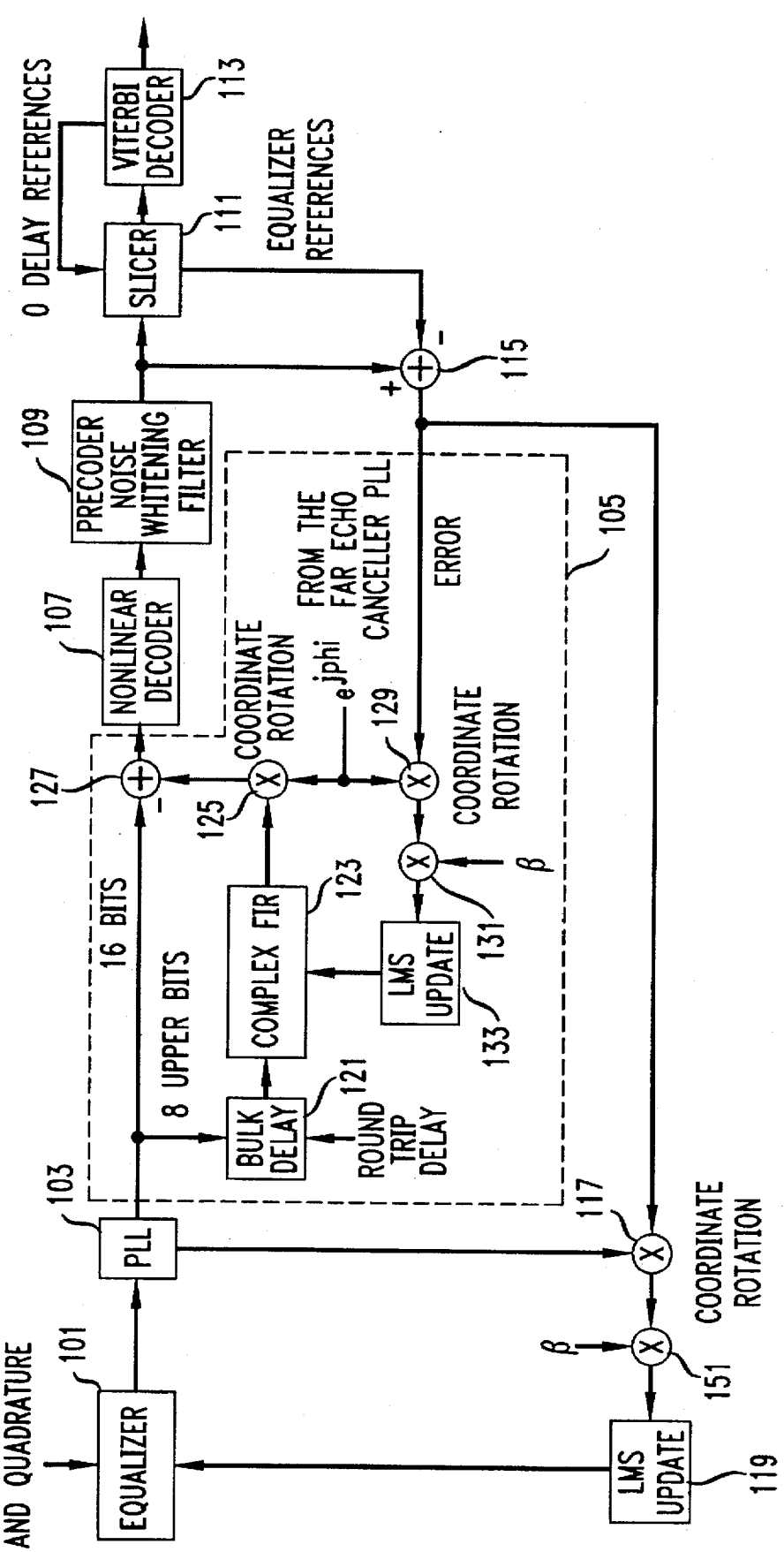
FIG. 1 shows an exemplary embodiment of a system for use by a receiving modem in canceling listener echo, in accordance with the principles of the invention.

FIG. 1 shows an exemplary embodiment of a portion of the receiver section of a receiving modem employing listener echo cancellation, in accordance with the principles of the invention.

The particular components of the receiver section of a receiving modem employing listener echo cancellation shown in FIG. 1 include a) adaptive equalizer 101, b) modem carrier recovery phase locked loop (PLL) 103, c) listener echo canceller 105, d) nonlinear decoder 107, e) precoder, e.g., noise whitening filter, 109 f) slicer 111, g) Viterbi decoder 113, h) adder 115, i) multiplier 117 for performing coordinate rotation, j) least mean square (LMS) update 119, and k) multiplier 151 for controlling the rate of LMS update 119. Except for listener echo canceller 105, the components of FIG. 1 are well known, and they are interconnected in the conventional manner for the receiver section of a receiving modem except for the passing of the output of PLL 103 through listener echo canceller 105.

Listener echo canceller 105 contains a) bulk delay 121, b) complex finite impulse response (FIR) filter 123, c) multipliers 125 and 129 for performing coordinate rotation, d) LMS update 133, e) multiplier 131 for controlling the rate of LMS update 133, f) adder 127. In accordance with the principles 6f the invention, listener echo canceller 105 operates to cancel the listener echo from the phase corrected adaptive equalizer output signal that is supplied to it from PLL 103. Listener echo canceller 105 operates at the symbol rate.

Bulk delay 121 is a programmable delay that is set to provide a delay equal to the round-trip delay determined during the modem training. Thus, bulk delay 121 approximates the additional delay experience by the listener echo beyond the delay of the directly received signal. Bulk delay 121 receives the phase corrected adaptive equalizer output signal from PLL 103 and delays it by a delay equal to the one round-trip. The delayed phase corrected adaptive equalizer output signal from bulk delay 121 is supplied to complex finite impulse response (FIR) filter 123. Note that both the real and imaginary parts of a complex number, or the in-phase and quadrature values, must be supplied. Also supplied to complex FIR filter 123 are updated coefficients which are supplied as an output from LMS update 133. Regarding the size of complex FIR filter 123, it has been found that providing complex FIR filter 123 with 20 taps achieves good listener echo cancellation.

The adaptive updating, or changing, of the coefficients used in complex FIR filter 123 by LMS update 133 is controlled in a manner similar to that used to adaptive update, or change the coefficients for adaptive equalizer 101 by LMS update 119. Generally, the error signal from adder 115 is rotated by an angle of rotation supplied to a multiplier which performs coordinate rotation. The resulting rotated error signal output is then multiplied by $\beta$, which is a changeable control value, typically a fraction, which controls the rate at which the coefficients are changed. The final product is then supplied to an LMS update which develops the filter coefficients that are used.

In particular, for controlling the coefficients used by equalizer 101, in the conventional manner, the error signal from adder 115 is rotated by an angle of rotation supplied as an output by PLL 103 to multiplier 117 which performs coordinate rotation of the error signal. Multiplier 151 then multiplies the resulting rotated error signal output by $\beta$ and the output from multiplier 151 is supplied to LMS update 119 for use in develop the filter coefficients that are used by adaptive equalizer 101. Similarly for controlling the coefficients used complex FIR filter 123, the error signal from adder 115 is rotated by an angle of rotation $e^{j\phi hi}$ by multiplier 129. The angle of rotation $e^{j\phi hi}$ is supplied from the far echo canceller PLL that is conventionally available. Multiplier 131 then multiplies the resulting rotated error signal output by $\beta$ and the output from multiplier 131 is supplied to LMS update 133 for use in developing the filter coefficients that are used by complex FIR filter 123.

The output of complex FIR 123 is rotated through an angle of rotation $e^{j\phi ki}$ by multiplier 125. The resulting rotated complex filter output signal is substantially the listener echo. This signal is then subtracted from the phase corrected adaptive equalizer output signal that is supplied from PLL 103 and the resulting, essentially listener echo free signal is supplied to nonlinear decoder 107 for further processing in the conventional manner.

It has been determined that, to achieve the necessary echo cancellation, not all of the bits of the phase corrected adaptive equalizer output signal from PLL 103 need be supplied to bulk delay 121, in accordance with an aspect of the invention. Instead, only particular ones of the most significant bits of the phase corrected adaptive equalizer output signal from PLL 103 need be supplied to bulk delay 121. The number of most significant bits of the phase corrected adaptive equalizer output signal that must be supplied to bulk delay 121 is a function of at least a) the number of bits used to represent the phase corrected adaptive equalizer output signal and the level of listener echo cancellation required. Note that the most significant bits of both the real and imaginary parts of a complex number, or the in-phase and quadrature values, must be supplied. It has been found that when using 16 bits to represent the phase corrected adaptive equalizer output signal only the 8 most significant, or upper, bits are necessary. By using only the bits that are actually necessary, the cost of listener echo canceller 105 can be kept low.

Figure 2:
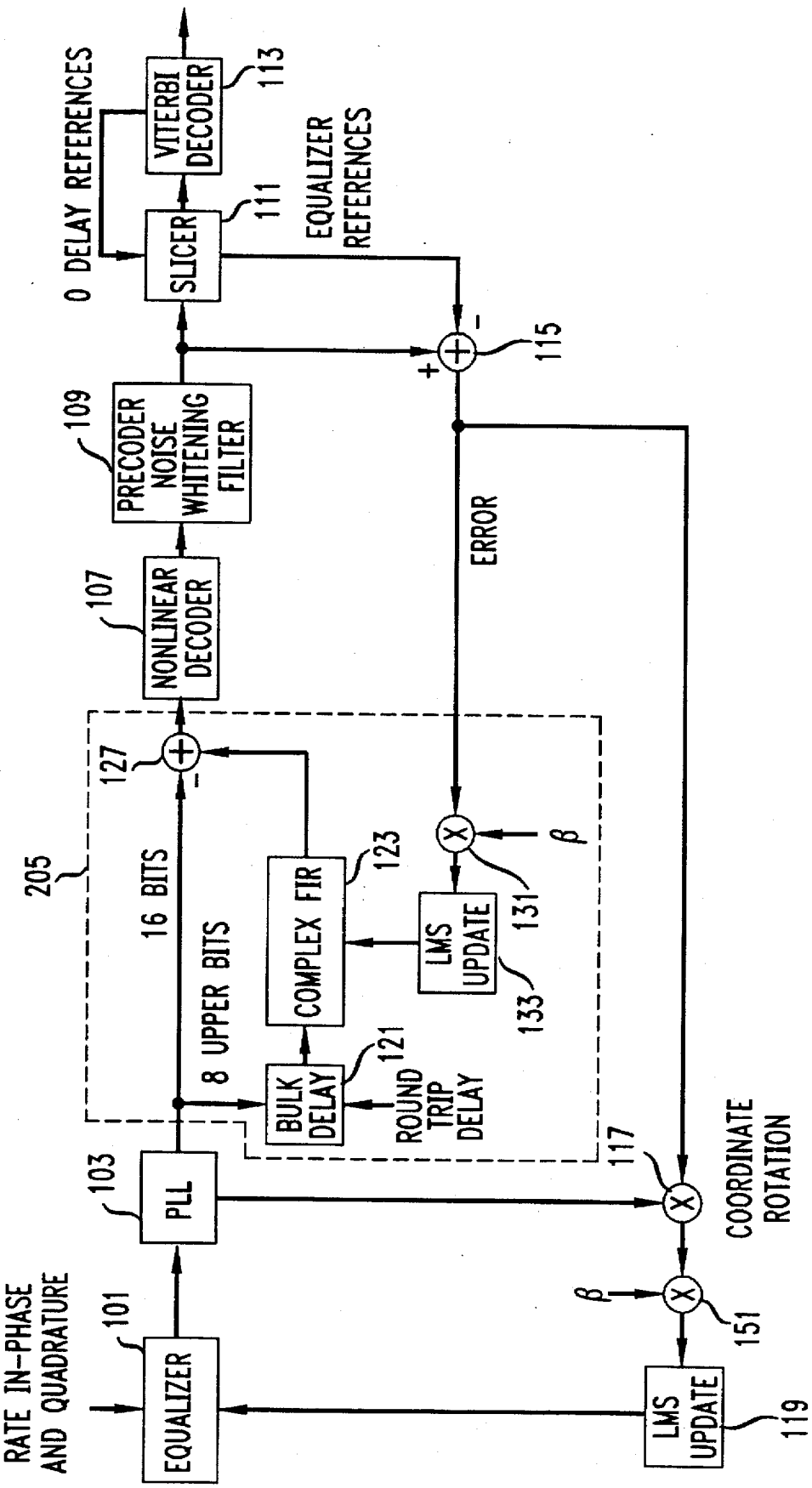
FIG. 2 shows another embodiment of the invention in which the cost of canceling the listener echo is reduced by employing additional aspects of the invention.

FIG. 2 shows another embodiment of the invention in which the cost of canceling the listener echo by echo canceller 205 is reduced by employing additional aspects of the invention. Note that identically numbered components of FIG. 1 and FIG. 2 perform the identical function while similarly numbered components differing by series number, i.e., 100 or 200, perform similar functions. The embodiment of the invention shown in FIG. 2 may be employed when it is recognized that the telephone network does not introduce any frequency offset of the modem signal in the channel. In particular, when there is no frequency offset of the modem signal in the channel, the constellation of symbol points is not rotating. Consequently, there is no need to perform the counter-rotation that is implemented in FIG. 1 by multipliers 129 and 125 and these components may be eliminated from echo canceller 205.

Note that when the counter-rotation is required, it is performed by multipliers 129 and 125 at the same rate at which the constellation is rotating, but in the opposite direction.

It is noted that the invention may be implemented in analog or digital circuitry, or in a combination thereof. It is also noted that the invention may be implemented on a digital signal processor.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A modem receiver comprising:

means for receiving a signal originated from a transmitting modem which contains a listener echo, said means for receiving a signal including means for processing the signal to produce a processed signal;

a listener echo cancellation circuit preceding a decoder circuit, and electrically coupled to said means for receiving a signal, said echo cancellation circuit including a delay means and a filter means, wherein said delay means receives at least a portion of said processed signal and delays said portion by a predetermined amount to obtain a delayed version of said processed signal, wherein said delay means provides the delayed version to said filter means, and wherein said filter means produces a signal which is a filtered version of said delayed version and combines said filtered version with said processed signal to substantially cancel the listener echo of said received signal such that a corrected signal is produced; and a precoder noise whitening filter electrically coupled to said echo cancellation circuit for receiving said corrected signal and for filtering noise out of said corrected signal.

2. The invention as defined in claim 1 wherein said modem receiver is operating at a particular symbol rate and said listener echo cancellation circuit also operates at said symbol rate.

3. The invention as claimed in claim 1 wherein said echo cancellation circuit further comprises a nonlinear decoder electrically coupled to said echo cancellation circuit and to said precoder for receiving said corrected signal, and wherein said decoder decodes said corrected signal and provides a decoded corrected signal to said precoder.

4. The invention as defined in claim 1 wherein said filter means includes:

a complex finite impulse response filter; and a combiner for combining said filtered version of said delayed version and said signal originated from a transmitting modem which contains a listener echo.

5. The invention as defined in claim 4 wherein said echo cancellation circuit further includes means for updating at least one filter coefficient of said finite impulse response filter.

6. The invention as defined in claim 4 wherein said listener echo cancellation circuit further includes means for coordinate rotating the output of said finite impulse response filter.

7. The invention as defined in claim 4 wherein said listener echo cancellation circuit further includes:

means for coordinate rotating the output of said finite impulse response filter; and means for coordinate rotating an error signal used for controlling updating of at least one coefficient of said finite impulse response filter.

8. The invention as defined in claim 4 wherein said modem receiver is in a modem that is communicating with said transmitting modem and wherein said delay is a delay of one round-trip between said transmitting modem and said receiving modem.

\* \* \* \* \*